(12) United States Patent
Judat et al.

(10) Patent No.: US 6,627,174 B1
(45) Date of Patent: Sep. 30, 2003

(54) AXIAL CONVEYOR AND LOOP REACTOR CONTAINING SAID AXIAL CONVEYOR

(75) Inventors: Helmut Judat, Langenfeld (DE); Wolfgang Hemmerle, Leverkusen (DE); Reinhold Rose, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/012,152

(22) Filed: Jan. 22, 1998

(30) Foreign Application Priority Data

Jan. 31, 1997 (DE) .......................... 197 03 551

(51) Int. Cl.⁷ .................. B01F 3/00; B01F 7/00
(52) U.S. Cl. ............... 423/659; 366/241; 406/197; 406/198; 422/129; 422/205; 422/209; 422/227; 422/239; 422/271; 422/273
(58) Field of Search .................. 422/137, 205, 422/209, 227, 239, 271, 273, 129; 423/659; 406/197, 198; 366/241

(56) References Cited

U.S. PATENT DOCUMENTS

| | | | | |
|---|---|---|---|---|
| 1,404,709 A | * | 1/1922 | Allbright | 422/227 |
| 3,349,894 A | | 10/1967 | Allen et al. | 198/215 |
| 3,580,419 A | | 5/1971 | Carter | 222/1 |
| 4,488,838 A | | 12/1984 | Herud | 406/56 |
| 4,919,849 A | * | 4/1990 | Litz et al. | 422/227 |
| 5,084,252 A | * | 1/1992 | Cahill et al. | 422/227 |
| 5,520,783 A | * | 5/1996 | White et al. | 422/227 |
| 5,846,498 A | * | 12/1998 | Kingsley | 422/227 |

FOREIGN PATENT DOCUMENTS

| | | |
|---|---|---|
| DE | 1916528 | 11/1969 |
| DE | 7022424 | 6/1971 |
| DE | 4119308 | 12/1992 |
| DE | 43 27 727 | 2/1995 |
| DE | 43 22 824 | 12/1995 |
| EP | 0 480 501 | 4/1992 |
| FR | 2 697 870 | 5/1994 |

OTHER PUBLICATIONS

Lueger, Lexikon der Technik, 4. Auflage, Deutsche Verlags-Anstalt Stuttgart, (month unavailable) 1970, pp. 389–391.

* cited by examiner

*Primary Examiner*—Stanley S. Silverman
*Assistant Examiner*—Timothy C. Vanoy
(74) *Attorney, Agent, or Firm*—Joseph C. Gil; Lyndanne M. Whalen

(57) ABSTRACT

An axial conveyor is described, in particular for conveying gas/liquid dispersions, wherein the conveying elements comprise a wall-sweeping edge pointing in the direction of the pressure side of the conveying elements. The axial conveyor is particularly suitable as a circulating member in loop reactors. A process comprising conveying gas/liquid dispersions as well as a process for carrying out chemical reactions directly reacting gas with gases not completely dissolved in a liquid medium, or optionally in the presence of finely divided solids, through the use of an axial conveyor, is also disclosed.

13 Claims, 4 Drawing Sheets

AXIAL CONVEYOR AND LOOP REACTOR CONTAINING SAID AXIAL CONVEYOR

FIELD OF THE INVENTION

The present invention relates to an axial conveyor which is suitable in particular for the transport of liquid/gas dispersions, preferably with a self-priming gassing agitator, and a loop reactor containing the axial conveyor.

BACKGROUND OF THE INVENTION

Axial conveyors generally comprise, within a conveying channel taking the form of a tubular section, a drivable axle with obliquely pitched, wall-sweeping conveying vanes or screws. In the course of transport by means of axial conveyors, and in the direction of transport, a pressure zone develops below and a suction zone develops above the vanes or screws. The pressure gradient that is formed as a result in the gap between conveying tube (housing) and vanes or screws brings about a backflow of the medium to be conveyed. In the case of the transport of liquid/gas dispersions, separation of gas bubbles occurs as a result of the gap and hence, the conveying capacity falls. This effect is further intensified by virtue of the fact that the angular momentum impressed upon the liquid by rotation of the screw or of the vanes is retarded by the wall friction, so that the gas bubbles in the vicinity of the wall segregate in the direction towards the wall and coalesce on the wall. In the case of relatively high gas contents, this results in the collapse of the conveying capacity.

Axial conveyors are therefore suitable only for the transport of liquid/gas dispersions having gas contents of up to 5 vol-%.

SUMMARY OF THE INVENTION

An axial conveyor for conveying gas/liquid dispersions, comprising conveying elements, in a substantially cylindrical conveying tube, wherein said conveying elements are selected from the group consisting of propellers, vanes or screws disposed on a drivable axle, whereby said conveying elements comprise a wall-sweeping lip. A process comprising conveying gas/liquid dispersions as well as a process for carrying out chemical reactions comprising directly reacting gas with gases not completely dissolved in a liquid medium in an axial conveyor is also disclosed

DETAILED DESCRIPTION OF THE INVENTION

Figure 2:
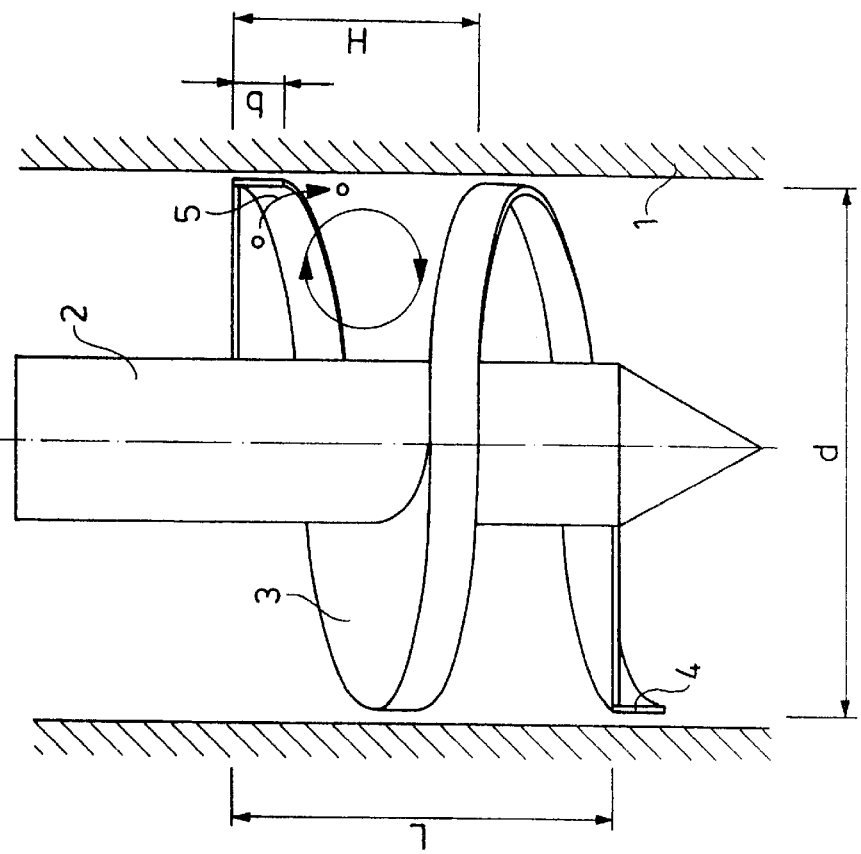
FIG. 2 shows an axial conveyor according to the present invention.

It has now been found that axial conveyors are very well suited for conveying liquid/gas dispersions if the conveying elements of the axial conveyor comprise a wall-sweeping lip on the pressure side. The lip has the effect that the pressure difference at the housing gap is reduced. Furthermore, the drop in pressure is effected via the extension of the lip in the axial direction—that is to say, the pressure gradient is reduced. The flow component directed radially outward on the pressure side is deflected in the direction of transport prior to reaching the housing gap, so that separation of gas bubbles via the gap is made more difficult. Furthermore, the angular momentum of the liquid is greatest on the inside of the lip, so that, relative to the liquid, the gas bubbles undergo a force away from the wall.

Accordingly, the present invention provides an axial delivery pump, in particular, for conveying liquid/gas suspensions, containing, disposed on a drivable axle, conveying elements, which take the form of propellers, vanes or screws within a housing, which takes the form of a tubular section, whereby the conveying elements comprise an lip on the pressure side.

The relative height of the lip—relative to the diameter of the conveying member—should range from at least 0.025 to 0.25, preferably 0.05 to 0.2, and, particular preferably from 0.075 to 0.15.

If use is made of propellers or Kaplan propellers by way of conveying elements, a number of blades between two and five is preferred. The setting angle of the propellers or Kaplan propellers may lie between 5 and 40°.

Together, the propellers cover at least 60%, more preferably at least 80%, of the circular surface defined by their outside diameter.

Screws, by way of conveying elements, are preferably of single-threaded to quadruple-threaded construction.

The pitch of the screw, that is, the relative lift—relative to the diameter—preferably, ranges from between 0.2 and 0.9.

According to the present invention, a satisfactory conveying capacity of the axial conveyor that is dependent on the speed of rotation is achieved, if the setting angle of the conveying elements and the height of the lip are matched to the delivery cross-section, the viscosity and the gas-bubble content of the medium to be conveyed.

By reason of the quasi-elastic properties of the medium to be conveyed (on account of the dispersed gas), however, if outside the bounds of the certain limits for the stated parameters, the axial conveyor inclines towards instabilities of flow behavior, particularly at right angles to the direction of transport, which also in the non-coalescing material system can lead to the coalescence of the gas bubbles also in the vicinity of the axle, with retroactive effect on the conveying capacity.

It has now been found that these instabilities can be avoided if an eddying is generated on the pressure side of the axial conveyor in the vicinity of the axle of the tubular section. This can be effected by means of an additional conveying member disposed on the pressure side of the axial conveyor, whereby the delivery cross-section of said conveying member amounts to ⅓ to ⅔, preferably approximately one half (½), of the cross-section of the tubular section. No particular demands need to be made with regard to the additional conveying member. For instance, the latter may be a simple straight-arm paddle agitator which is disposed on the extended axle of the axial conveyor and which has a radius ranging from between 0.55 times and 0.82 times, preferably approximately 0.7 times, the radius of the tubular section. The setting angle of the additional conveying member preferably ranges from between 1.5 times and 2.5 times the setting angle of the conveying elements of the axial conveyor, but no more than 75°.

The spacing of the additional conveying member from the axial conveyor is preferably so dimensioned that a retroactive effect of the vortex that is generated by the additional conveying member with axial forward flow and peripheral backflow in the tubular section is avoided. The spacing of the additional conveying member from the discharge end of the axial conveyor preferably corresponds to at least the diameter of the tubular section, and particularly preferable between 1.5 and 3 times the diameter of the tubular section.

According to another embodiment of the invention, the additional conveying member is constructed as a gassing agitator. In this case, the common axle of the axial conveyor and the additional conveying member comprise an axial bore leading into the conveying elements of the additional conveying member, which are likewise of hollow construction.

The gas for the gassing operation is introduced into the axle in a manner known per se, preferably aspirated itself, via suitable inlet members and is distributed in the liquid/gas dispersion by means of discharge apertures which are provided on the periphery of the additional conveying member.

The axial conveyor according to the present invention is suitable, in particular, as a conveying member in loop reactors in which reactions with gases, or reactions accompanied by release of gases, take place in liquid phase, as in fermenters for example, or in the case of direct reactions, with oxygen, hydrogen, chlorine or other gases that are not completely dissolved in the liquid medium, or optionally, in the presence of solids such as finely divided catalysts (sludge-phase reactions).

Figure 1:
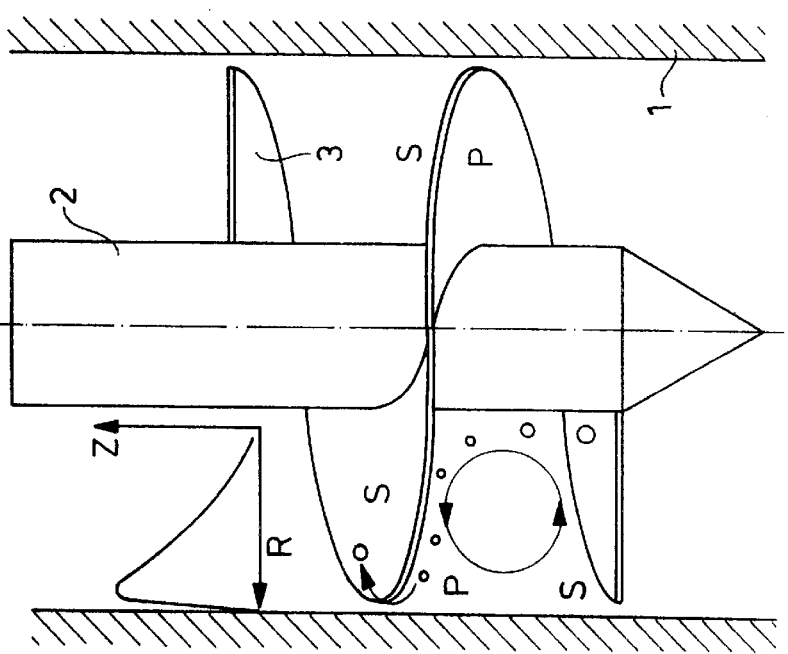
FIG. 1 shows a screw conveyor according to the state of the art.

FIG. 1 shows a presently used screw conveyor consisting of a cylindrical housing 1 with an axle 2 disposed therein which is capable of being driven in rotation and on which a screw 3 is arranged. The liquid/gas dispersion is conveyed in a downward direction, the pressure zone P being formed below the screw and the suction zone S being formed above the screw. A rotation about the axle is superimposed on the transport in the axial direction. Further superimposed on this spiral conveying movement is a rolling movement, indicated by the circle provided with arrows, which in the pressure zone P, conveys the medium to be conveyed outwards and in the suction zone S, conveys the medium to be conveyed towards the axle. In the gap between screw 3 and housing 1, separation of the dispersed gas bubbles occurs by reason of the pressure gradient prevailing between the pressure side and suction side. Furthermore, the centrifugal force Z acting on the liquid by reason of the rotation is represented qualitatively as a function of the radius R.

FIG. 2 shows an axial conveyor according to the present invention, herein the screw 3 comprises a peripheral lip 4 on the pressure side. The single-threaded screw that is represented exhibits a pitch H/d=0.485 and a relative length L/d=0.75. The relative height of the lip 4 amounts to b/d=0.1. As indicated by the arrow 5, the flow component directed radially outward on the pressure side is deflected by the lip 4 in the direction of transport, so that the gas bubbles contained therein are no longer separated by the pressure gradient between the upper side and underside of the screw 3 which is reduced by means of the lip 4.

Figure 3:
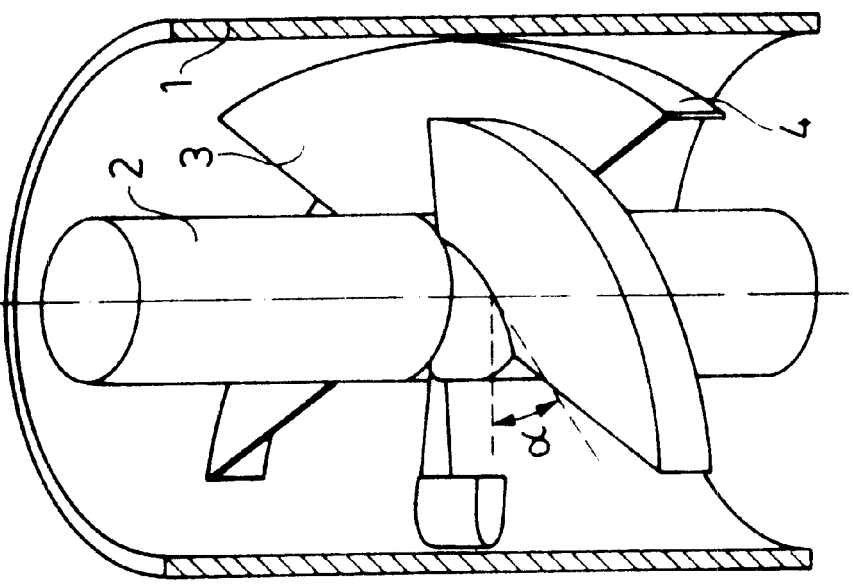
FIG. 3 shows a Kaplan propeller according to the present invention.

FIG. 3 shows a Kaplan propeller according to the present invention with four vanes 3, the setting angle α, which amounts to 30°. The vanes 3 cover (with the exception of the gap in relation to the housing) the entire cross-section of the conveying tube 1.

Figure 4:
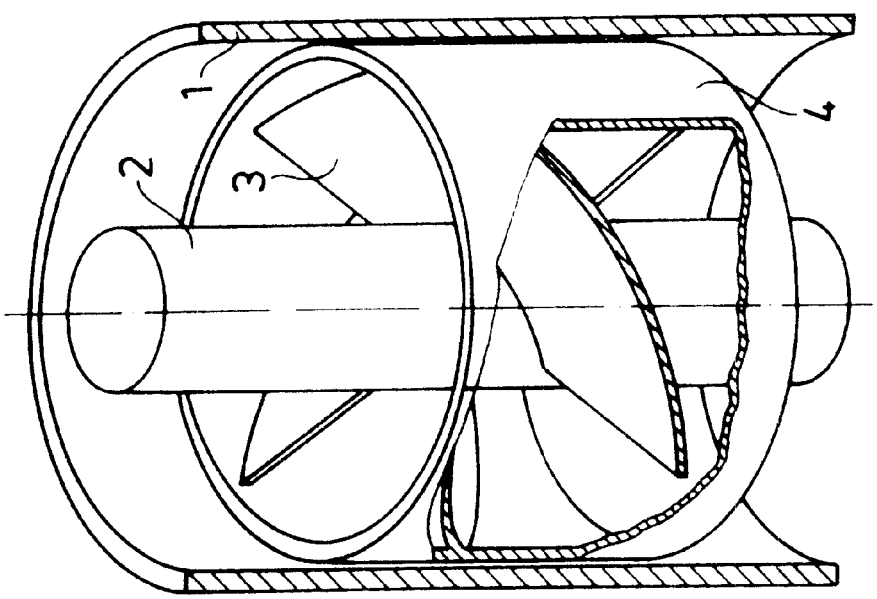
FIG. 4 shows an alternative embodiment of an axial conveyor of the present invention.

FIG. 4 shows an embodiment of an axial conveyor according to the present invention in which the lip 4 is constructed in the form of an outer cylinder surface surrounding the vanes 3.

Figure 5:
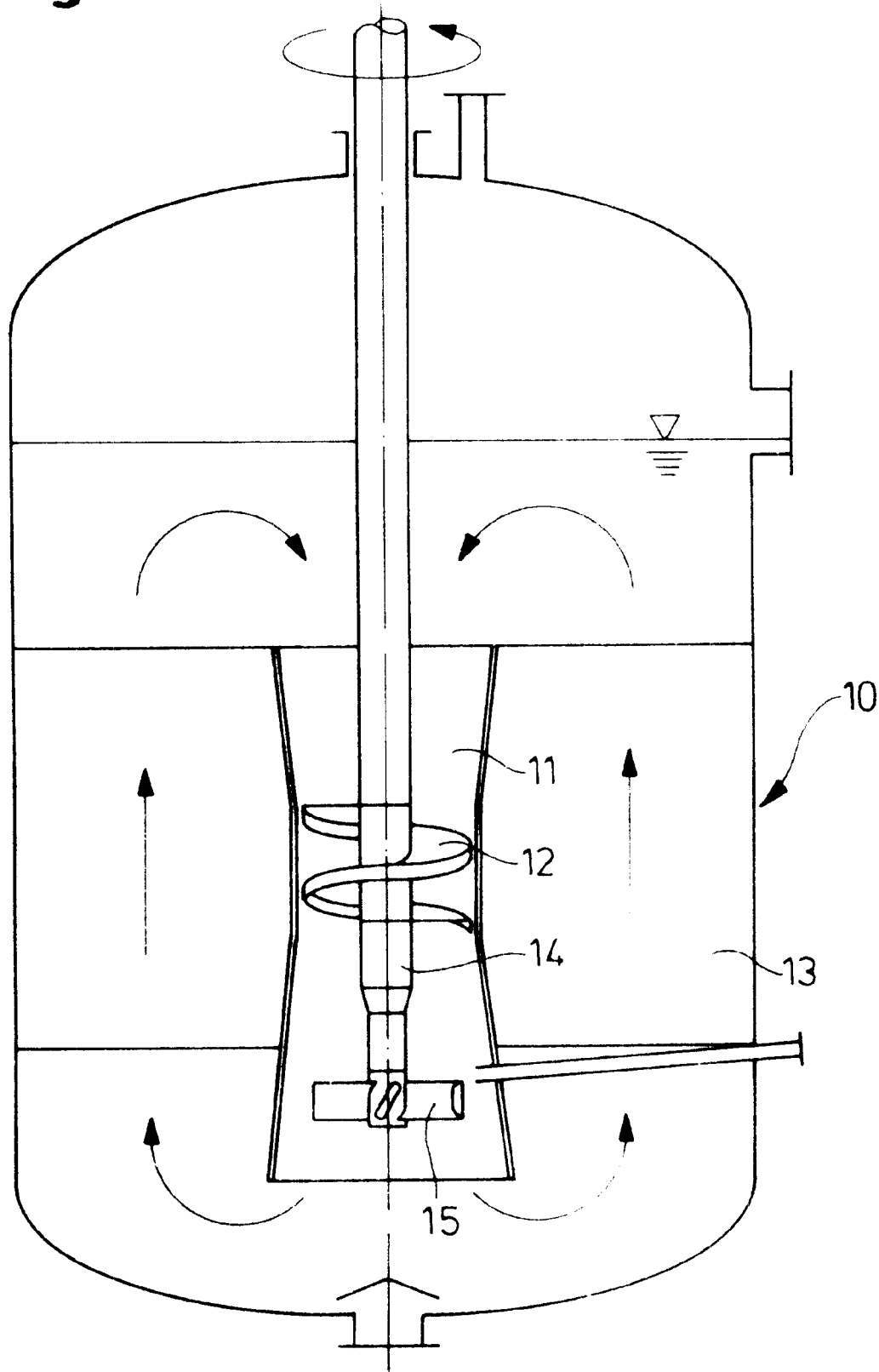
FIG. 5 shows a loop reactor with a central flow tube in which an axial conveying member according to the present invention is located.

FIG. 5 shows a loop reactor 10 with a central flow tube 11 in which an axial conveying member 12 according to the present invention is located. In the loop reactor 10, a gas/liquid dispersion is recirculated in accordance with the arrows shown. The central conduit 11 is held by radial guide plates 13, whereby the guide plates simultaneously prevent the rotating flow that is impressed by the conveyor 12. The axial conveyor 12 comprises an additional conveying member 15 that is rigidly connected to said axial conveyor on the axle 14, whereby the radius of said conveying member 15 covers only a part of the cross-section of the conduit 11.

Figure 6:
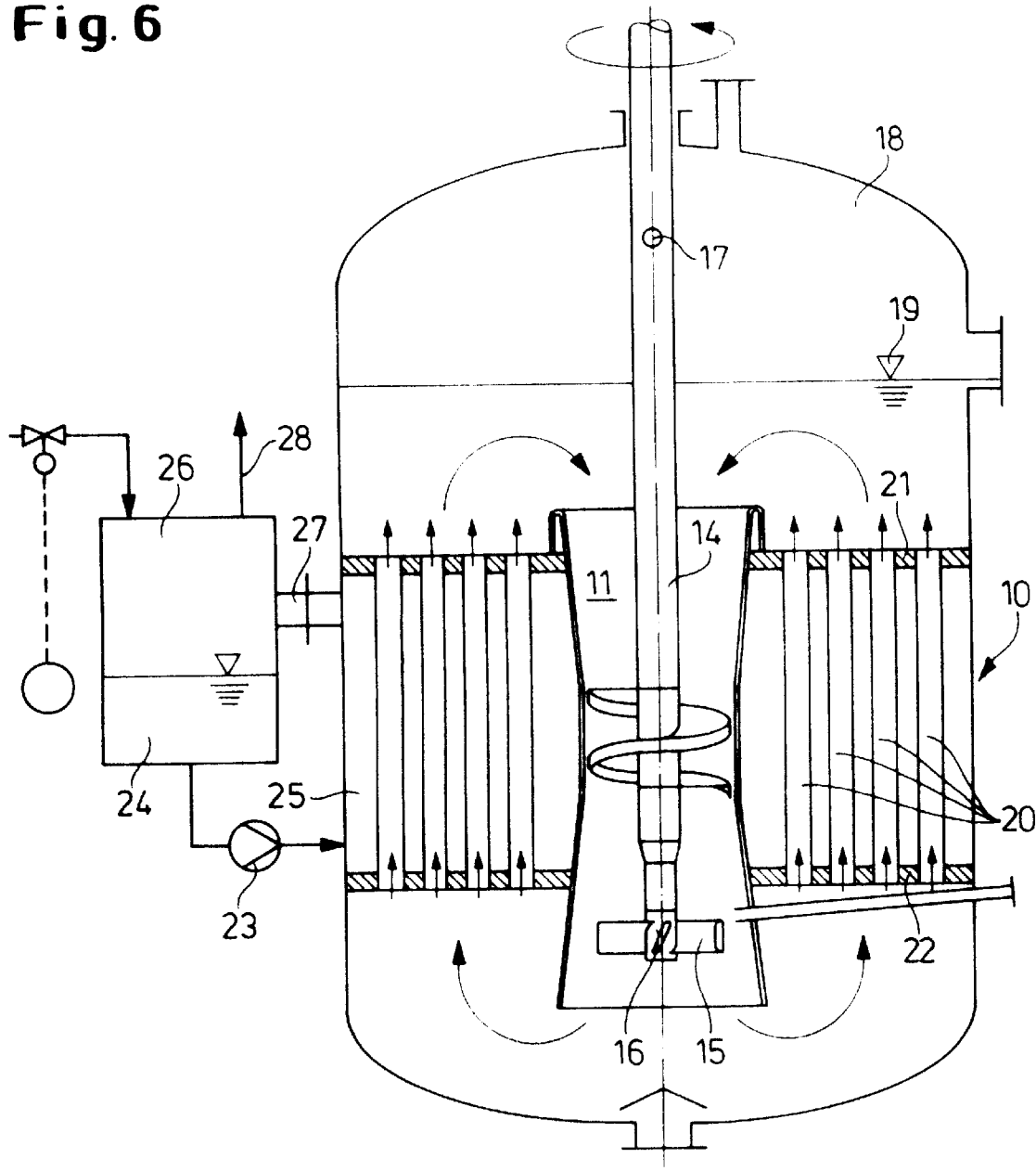
FIG. 6 shows a loop reactor according to the present invention in which the additional conveying member is constructed as a self-priming gassing agitator

FIG. 6 shows a loop reactor in which the additional conveying member 15 is constructed as a self-priming gassing agitator. The gassing medium is aspirated out of the gas compartment 18 above the liquid level 19 through appropriate suction apertures 17 in the axle 14 of hollow construction pertaining to the conveying member 15 and is finely distributed in the liquid by means of the arms 15 of the agitator which are of hollow construction and which communicate with the suction aperture 17. Furthermore, the backflow of the gas/liquid dispersion is effected through heat-exchange tubes 20 which are held by tube plates 21 and 22.

Within the conduit 11, there may be mounted flow-directing fittings (not shown) which prevent the rotation of the gas/liquid dispersion.

The exchange of heat is effected in this embodiment by means of a heat-exchange liquid which is conveyed by means of a pump 23 out of the sump 24 of the separator 26 into the space 25 between the heat-exchange tubes 20 and is evaporated there. Through the connecting pipe 27, the vapor/liquid mixture reaches the separator 26, where the vapor separates from the liquid and can be drawn off through line 28. With the aid of evaporative cooling, very large amounts of heat can be dissipated.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for conveying a liquid containing dispersed gas in a downward direction comprising an axial conveyor, wherein said axial conveyor comprises conveying elements in a substantially cylindrical conveying tube, wherein said conveying elements are selected from a group consisting of propellers, vanes or screws disposed on a drivable axle, wherein said conveying elements comprise a wall-sweeping lip perpendicular to the conveying element and projecting in a direction corresponding to that of the axial conveyor's pressure side having a height relative to the conveying element's diameter of from 0.025 to 0.25, and wherein an additional conveying member is provided on the pressure side of said axle of said axial conveyor, the additional conveying member having a delivery cross-section of from 1/3 to 2/3 of the cross-section of the conveying tube, the additional conveying member being spaced from the axial conveyor's discharge end by a distance at least equal to the conveying tube's diameter.

2. An apparatus according to claim 1 wherein said additional conveying member is a gassing agitator.

3. The apparatus of claim 1, wherein the conveying members comprise propellers that cover at least 60% of the circular surface defined by their outer diameter.

4. A process comprising conveying a liquid containing dispersed gas in a downward direction through an axial conveyor comprising conveying elements in a substantially cylindrical conveying tube, wherein said conveying elements are selected from a group consisting of propellers, vanes or screws disposed on a drivable axle, wherein said conveying elements comprise a wall-sweeping lip perpendicular to the conveying element and projecting in a direction corresponding to that of the axial conveyor's pressure side having a height relative to the conveying element's diameter of from 0.025 to 0.25, and wherein an additional conveying member is provided on the pressure side of said axle of said axial conveyor, the additional conveying member having a delivery cross-section of from $1/3$ to $2/3$ of the cross-section of the conveying tube, the additional conveying member being spaced from the axial conveyor's discharge end by a distance at least equal to the conveying tube's diameter.

5. A process according to claim 4, wherein said additional conveying member is a gassing agitator.

6. The process of claim 4, wherein the conveying members comprise propellers that cover at least 60% of the circular surface defined by their outer diameter.

7. An apparatus comprising a loop reactor containing by way of a central circulating member, an axial conveyor comprising conveying elements, in a substantially cylindrical conveying tube, wherein said conveying elements are selected from a group consisting of propellers, vanes or screws disposed on a drivable axle, wherein said conveying elements comprise a wall-sweeping lip perpendicular to the conveying element and projecting in a direction corresponding to that of the axial conveyor's pressure side having a height relative to the conveying element's diameter of from 0.025 to 0.25, wherein an additional conveying member is provided on the pressure side of said axle of said axial conveyor, the additional conveying member having a delivery cross-section of from $1/3$ to $2/3$ of the cross-section of the conveying tube, the additional conveying member being spaced from the axial conveyor's discharge end by a distance at least equal to the conveying tube's diameter.

8. An apparatus according to claim 7, wherein said additional conveying member is a gassing agitator.

9. The apparatus of claim 7, wherein the conveying members comprise propellers that cover at least 60% of the circular surface defined by their outer diameter.

10. A process for carrying out chemical reactions comprising directly reacting gas with gases not completely dissolved in a liquid medium, in an axial conveyor comprising conveying elements in a substantially cylindrical conveying tube, wherein said conveying elements are selected from a group consisting of propellers, vanes or screws disposed on a drivable axle, wherein said conveying elements comprise a wall-sweeping lip perpendicular to the conveying element and projecting in a direction corresponding to that of the axial conveyor's pressure side having a height relative to the conveying element's diameter of from 0.025 to 0.25, wherein said axial conveyor is contained by way of central circulating member in a loop reactor and wherein an additional conveying member is provided on the pressure side on said axle of said axial conveyor, the additional conveying member having a delivery cross-section of from $1/3$ to $2/3$ of the cross-section of the conveying tube the additional conveying member being spaced from the axial conveyor's discharge end by a distance at least equal to the conveying tube's diameter.

11. A process according to claim 10, wherein said additional conveying member is a gassing agitator.

12. The process of claim 10, wherein the reaction is carried out in the presence of finely divided solids.

13. The process of claim 10, wherein the conveying members comprise propellers that cover at least 60% of the circular surface defined by their outer diameter.

* * * * *